US010785103B2

(12) United States Patent
Prabhu et al.

(10) Patent No.: US 10,785,103 B2
(45) Date of Patent: *Sep. 22, 2020

(54) METHOD AND SYSTEM FOR MANAGING CONTROL CONNECTIONS WITH A DISTRIBUTED CONTROL PLANE

(71) Applicant: Cisco Technology, Inc., San Jose, CA (US)

(72) Inventors: Vinay Prabhu, Milpitas, CA (US); Praveen Kariyanahalli, San Ramon, CA (US); Manan Shah, San Jose, CA (US); Atif Khan, San Jose, CA (US); Shreyas Heranjal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,427

(22) Filed: Apr. 3, 2019

(65) Prior Publication Data
US 2019/0229991 A1 Jul. 25, 2019

Related U.S. Application Data

(63) Continuation of application No. 15/286,116, filed on Oct. 5, 2016, now Pat. No. 10,291,469.

(51) Int. Cl.
*H04L 12/24* (2006.01)
*H04L 12/28* (2006.01)
(Continued)

(52) U.S. Cl.
CPC .......... *H04L 41/0816* (2013.01); *H04L 12/28* (2013.01); *H04L 12/46* (2013.01);
(Continued)

(58) Field of Classification Search
CPC ..... H04L 41/0816; H04L 12/28; H04L 12/46; H04L 12/4633; H04L 41/042;
(Continued)

(56) References Cited

U.S. PATENT DOCUMENTS

| 2003/0079031 A1* | 4/2003 | Nagano ................... H04L 29/06 709/229 |
| 2007/0030823 A1 | 2/2007 | Guo et al. |

(Continued)

FOREIGN PATENT DOCUMENTS

WO 2015007665 A1 1/2015

OTHER PUBLICATIONS

International Search Report and Written Opinion from PCT Application No. PCT/US2017/055444 dated Dec. 26, 2017.

*Primary Examiner* — Obaidul Huq
(74) *Attorney, Agent, or Firm* — Polsinelli PC

(57) ABSTRACT

A method and system for managing connections with a distributed control plane is provided. The method includes generating, by a router, a controller identifier (ID) list comprising a plurality of controller group IDs of a plurality of controller groups, wherein one controller group ID uniquely identifies one controller group. The method also includes identifying a first controller group, by the router from the list, with which a connection is to be established. Further, the method includes establishing, by the router, the connection with a controller of the first controller group if at least one of following conditions is met 1) the router has not exhausted maximum number of connections, 2) the router has previously had a connection with the controller of the first controller group, and 3) the router has an existing connection with a controller of a second controller group not present in the list.

14 Claims, 7 Drawing Sheets

(51) Int. Cl.
  *H04L 12/46* (2006.01)
  *H04L 12/715* (2013.01)
  *H04L 12/721* (2013.01)

(52) U.S. Cl.
  CPC ........ *H04L 12/4633* (2013.01); *H04L 41/042* (2013.01); *H04L 41/0893* (2013.01); *H04L 45/64* (2013.01); *H04L 41/0896* (2013.01); *H04L 45/44* (2013.01)

(58) Field of Classification Search
  CPC . H04L 41/0893; H04L 45/64; H04L 41/0896; H04L 45/44
  USPC ........................................................ 370/254
  See application file for complete search history.

(56) References Cited

U.S. PATENT DOCUMENTS

| | | |
|---|---|---|
| 2013/0279899 A1 | 10/2013 | Doverspike et al. |
| 2016/0226741 A1 | 8/2016 | Ganichev et al. |
| 2017/0164135 A1 | 6/2017 | Kodaypak et al. |

\* cited by examiner

Prior Art

METHOD AND SYSTEM FOR MANAGING CONTROL CONNECTIONS WITH A DISTRIBUTED CONTROL PLANE

CROSS-REFERENCE TO RELATED APPLICATIONS

This application is a Continuation of U.S. application Ser. No. 15/286,116, filed on Oct. 5, 2016, the content of which is incorporated herein by reference in its entirety.

TECHNICAL FIELD

The present disclosure relates to a method and a system for managing control connections and, more particularly, to a method and system for managing control connections with a distributed control plane.

BACKGROUND

Over a period of time, use of software defined network (SDN) has increased. The reason behind the increase is the convenience with which such network can be managed. One example SDN 100 is shown in FIG. 1 (prior art). The SDN 100 includes a network management system (NMS) 102 for managing policies and other things in the SDN 100. The SDN 100 also includes a controller pool 104 including a plurality of controllers, such as a controller 106A, a controller 106B and a controller 106C. Each controller is connected to one or more routers, for example, the controller 106A is connected to a router 108A via a connection 110A and to a router 108B via a connection 110C. The controller 106B is connected to the router 108A via a connection 110B, to the router 108B via a connection 110D, and to a router 108C via a connection 110E. The controller 106C is connected to the router 108C via a connection 110F.

Load balancing of the connections between routers and the controllers is a problem, because all controllers are present in a single pool and it causes several issues related to scalability. For example, distribution of the controller pool 104 across the globe introduces different loss or latency characteristics based on the geolocation and distances between the routers and the controller. Load on any controller of the controller pool 104 is difficult to manage as router components are free to choose a controller to connect with from the controller pool 104. In addition, redundancy across failure domains cannot be guaranteed. Over-provisioning of hardware and software capabilities of the controller is another issue and has to be part of the SDN 100 design as scales becomes difficult to predict especially during failures. In addition, it is an operational nightmare to isolate and detect faults in a huge controller pool I 04. There is a lack of control regarding which bandwidth channel to use to run the controller pool I 04. Further, it leads to inability to guarantee a prevention of the SDN 100 downtime during maintenance windows.

Therefore, there is a need for a method and a system for managing control connections with a distributed control plane.

SUMMARY

Various methods, apparatuses and computer readable mediums for managing connections with a distributed control plane are provided.

In one embodiment, the method includes generating, by a router, a controller group identifier (ID) list comprising a plurality of controller group IDs of a plurality of controller groups, wherein one controller group ID uniquely identifies one controller group. The method also includes identifying a first controller group, by the router from the list, with which a connection is to be established. Further, the method includes establishing, by the router, the connection with a controller of the first controller group if at least one of following conditions is met 1) the router has not exhausted maximum number of connections, 2) the router has previously had a connection with the controller of the first controller group, and 3) the router has an existing connection with a controller of a second controller group not present in the list.

In another embodiment, the method includes dividing a set of controllers into a plurality of controller groups, each controller group comprising one or more controllers. The method also includes, for each controller group, assigning a controller group identifier (ID) uniquely identifying that controller group. Further, the method includes generating a list comprising a plurality of controller group IDs of a plurality of controller groups in order of priority of connection. Moreover, the method includes identifying a first controller group, from the list, with which a connection is to be established by a router. Furthermore, the method includes establishing the connection with a controller of the first controller group if at least one of following conditions is met 1) the router has not exhausted maximum number of connections, 2) the router has previously had a connection with the controller of the first controller group, and 3) the router has an existing connection with a controller of a second controller group not present in the list.

In one embodiment, the system includes a router. The router includes a processor, and a memory coupled to the processor. The memory stores instructions which when executed cause the router to perform the method to manage connections with a distributed control plane. The method includes generating, by the router, a controller group identifier (ID) list comprising a plurality of controller group IDs of a plurality of controller groups, wherein one controller group ID uniquely identifies one controller group. The method also includes identifying a first controller group, by the router from the list, with which a connection is to be established. Further, the method includes establishing, by the router, the connection with a controller of the first controller group if at least one of following conditions is met 1) the router has not exhausted maximum number of connections, 2) the router has previously had a connection with the controller of the first controller group, and 3) the router has an existing connection with a controller of a second controller group not present in the list.

In one embodiment, a non-transitory computer-readable medium having stored instructions which when executed by a router causes the router to perform a method to manage connections with a distributed control plane is provided. The method includes generating, by the router, a controller group identifier (TD) list comprising a plurality of controller group IDs of a plurality of controller groups, wherein one controller group ID uniquely identifies one controller group. The method also includes identifying a first controller group, by the router from the list, with which a connection is to be established. Further, the method includes establishing, by the router, the connection with a controller of the first controller group if at least one of following conditions is met 1) the router has not exhausted maximum number of connections, 2) the router has previously had a connection with the controller of the first controller group, and 3) the router has an existing connection with a controller of a second controller group not present in the list.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an example embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
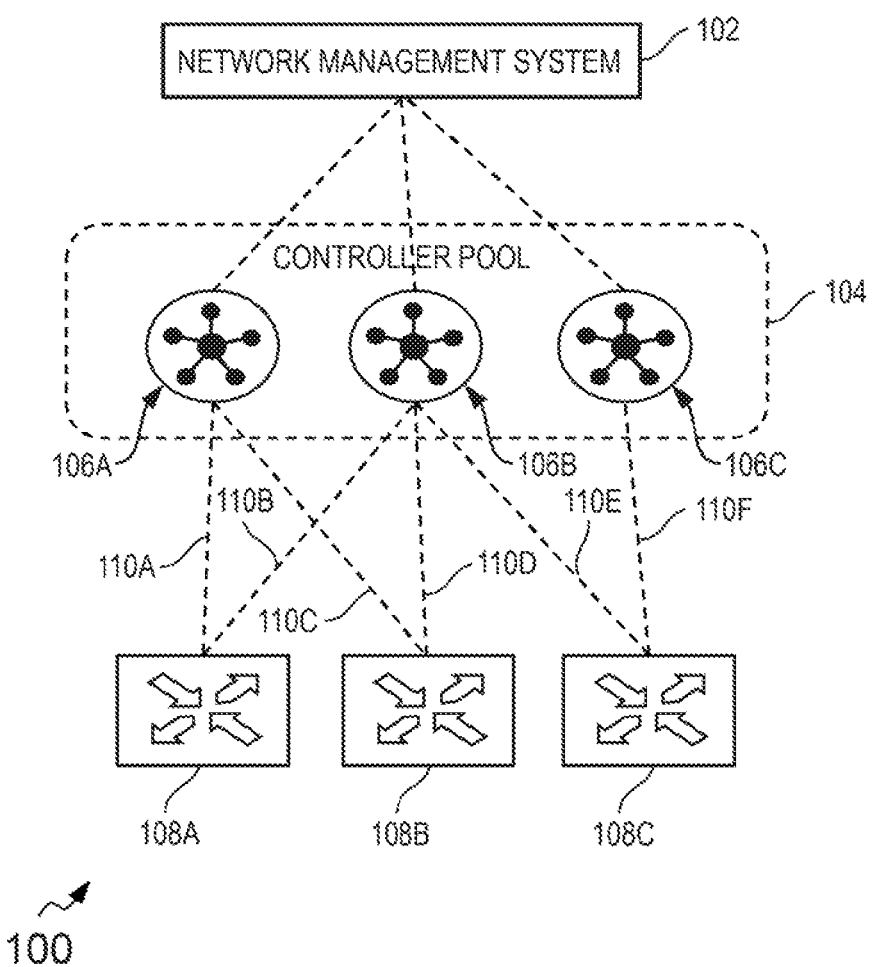
FIG. 1 shows a prior art.
Figure 2:
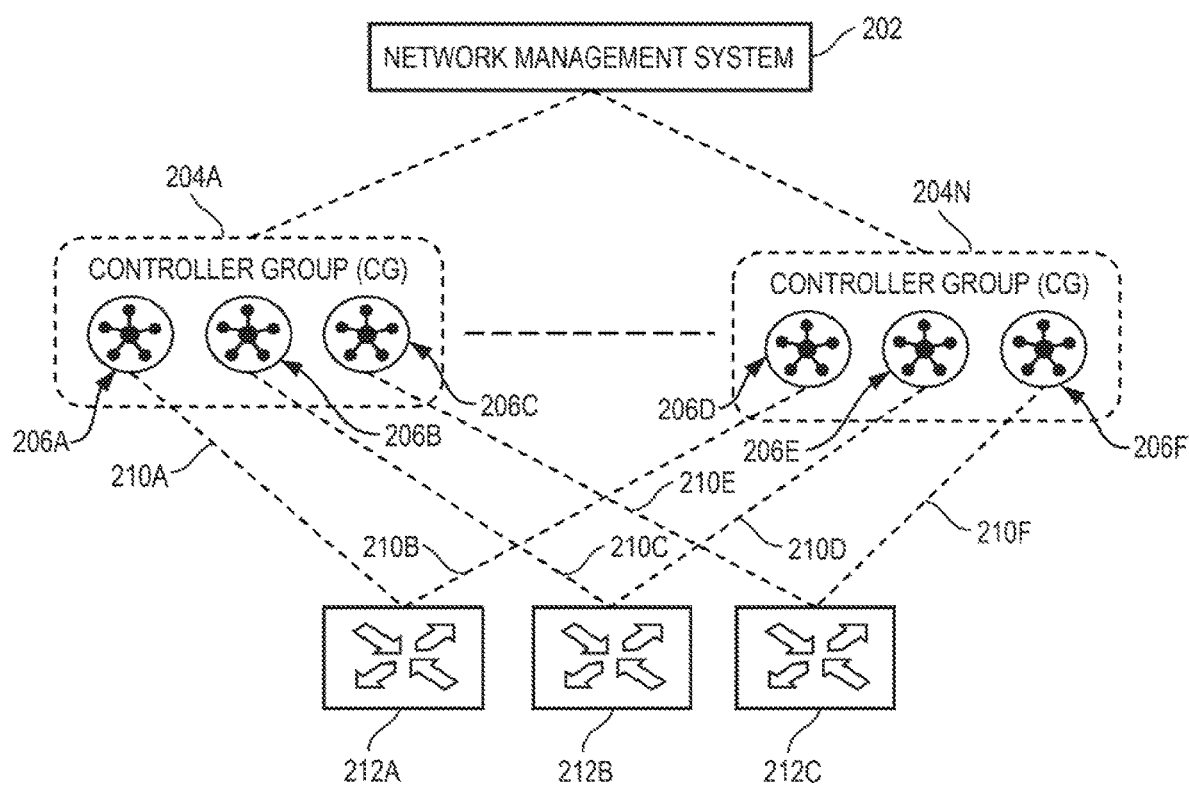
FIG. 2 illustrates an environment, m accordance with an example embodiment of the present disclosure.

FIG. 2 illustrates an environment, m accordance with an example embodiment of the present disclosure.

Example of the environment includes, but is not limited to, a software defined network (SDN). The SDN can be present or implemented at number of locations including, but not limited to, banks, retail merchants, and healthcare facilities. In one embodiment, the SDN is a SD-wide area network (SD-WAN).

The environment includes a network management system (NMS) 202. The NMS 202 enables centralized configuration and management of the SDN, and may also provide a real-time dashboard on health of the SDN.

The environment also includes a plurality of controller groups, for example a controller group 204A to a controller group 204N. The number of controller groups is configurable and can be determined by SDN administrator based on various factors, such as geo-location, capability of each controller, bandwidth, number of controllers and so on. Each controller group is uniquely identified by a controller group identifier (ID). The controller group ID can be generated using any existing technique. Each controller group includes one or more controllers. For example, the controller group 204A includes a controller 206A, a controller 206B, and a controller 206C. Similarly, the controller group 204N includes a controller 206D, a controller 206E, and a controller 206F. In addition to controller group TD, each controller also has an internet protocol (IP) address that uniquely identifies the controller. The hardware structure of controller is defined in detail in conjunction with FIG. 3 and FIG. 4. The controllers manage routing, policy, security, segmentation, and authentication of all devices on the SD-WAN.

The environment also includes a plurality of nodes, for example a node 212A, a node 212B, and a node 212C. In one embodiment, each of the nodes 212A, 212B and 212C is a router. The nodes 212A, 212B and 212C are also referred to as routers 212A, 212B and 212C, respectively in the present description. Hence, the environment includes the router 212A, the router 212B, and the router 212C (individually also referred to as a 'router 212'). It is to be appreciated that the remaining description is explained using the router as an example.

The devices, i.e. the NMS 202, the controller groups, and the routers, of the environment are communicatively coupled via an intermediate WAN. The routers may be located at different geographic locations, branches, remote offices, data centers, customer premises, or on different circuits, carrier networks etc. The routers provide highly secure data connectivity over any transport.

The routers can be connected to the controllers of the controller group via WAN or Broadband internet or 4G/LTE, or any other type of network. For example, the router 212A is connected to the controller 206A of the controller group 204A via a connection 210A and is connected to the controller 206D of the controller group 204N via a connection 210B. Similarly, the router 212B is connected to the controller 206B of the controller group 204A via a connection 210C and is connected to the controller 206E of the controller group 204N via a connection 210D, and the router 212C is connected to the controller 206C of the controller group 204A via a connection 210E and is connected to the controller 206F of the controller group 204N via a connection 210F. Each of the connection 210A to 201F (individually referred to as 'connection 210' and collectively referred to as 'connections 210') can be referred to as a control channel or control connection.

In one embodiment, the controller groups are together referred to as distributed control plane. In another embodiment, the distributed control plane in addition to the controller groups can also include the NMS 202 and the connections 210. In yet another embodiment, the distributed control plane in addition to the controller groups can also include the NMS 202, the connections 210, and the routers. The connections 210 enable communication between the routers and connected controller groups.

The functioning of the environment is now explained using example of tokens. It is to be appreciated that any mechanism other than tokens can also be used.

Initially, each controller is configured to belong to a particular controller-group-id (CGID). Each router is configured to have a list of CGIDs in order of connection priorities. The list can be referred to as the controller group ID list or the controller group list, because each controller group ID uniquely identifies corresponding controller group. In one embodiment, the configuration is performed at the system level, i.e. at the overlay management protocol (OMP) session level in a decreasing order of preference of controller groups with which connections are to be established in a round-robin fashion moving through the controller group ID list.

In an embodiment, each router is configured to have <X> number of unmarked tokens at the start, where X is the number of unique controllers that the SDN administrator wants the router to establish a connection with and is configured at the system level, i.e. at the OMP session level, for the router. Each transport interface on the router is also provided with <Y> number of tokens, where Y is the number of connections the SDN administrator wishes to establish through a particular transport and is configured at the interface level. In other words, a first set of one or more tokens, i.e. <X> tokens, are allocated to the router, wherein the first set of one or more tokens indicate maximum number of OMP sessions that the router can have. A second set of one or more tokens, i.e. <Y> tokens, are allocated to the transport interface of the router, wherein the second set of one or more tokens indicate maximum number of connections that the router can have through a particular transport corresponding to the transport interface.

Each transport interface on the connection 210 or corresponding router can also be configured with an Exclude-Controller-Group-List (EXCGL) in order to skip token allocation to a particular controller group while moving in a round-robin fashion through the controller group ID list, i.e. the transport interface is assigned or allocated with an exclusion list of controller group IDs of one or more controller groups with which connection is to be never established.

Each transport interface on the connection 210 or corresponding router tries to establish a minimum of (X, Y) count of connections towards assigned controllers. The maximum number of connections that the router can have with the plurality of controller groups in the controller group ID list is calculated as a minimum number of 1) a number of one or more tokens in the first set, and 2) a number of one or more tokens in the second set.

The assigned controllers include controllers that the router has hashed to in each of the controller groups specified in the controller group list. In illustrated example, the maximum number of OMP sessions, i.e. X is limited to 2, and the maximum number of connections, i.e. Y, that the router can have with the controller groups for a particular transport are also limited to 2. Hence, each router is connected to two controllers of two controller groups in FIG. 2. It is to be appreciated that in various embodiments, the number of connections per router can vary and can take any number.

Once a connection is established, then an unmarked token is marked with the <CGID+Controller-IP>, i.e. upon establishment of the connection between the router and a controller of a first controller group, a token in the first set and a token in the second set are marked with controller group TD of the first controller group and with IP address of the controller of the first controller group. The controller-IP is the IP address of the controller. The first controller group refers to the controller group identified from the controller group ID list with which the connection of the router is to be established in order of connection priority.

A connection is allowed to be established when at least one of following conditions is met. I) The router has not exhausted maximum number of connections, 2) the router has previously had a connection with the controller of a first controller group, and 3) the router has an existing connection with a controller of a second controller group not present in the controller group ID list.

The condition that the router has not exhausted maximum number of connections is identified by determining at least one unmarked token. This is the case when there is at least one unmarked token available.

The condition that the router has previously had a connection with the controller of the first controller group is identified by determining a token marked with controller group ID of the first controller group and with internet protocol (IP) address of the controller of the first controller group. This is the case when there is a marked token with same <CGID+Controller-IP> to which the transport corresponding to the router is trying to connect.

The condition that the router has an existing connection with the controller of the second controller group not present in the controller group ID list is identified by determining a token marked with controller group ID of the second controller group and with internet protocol (IP) address of a controller of the second controller group. This is the case when there is a token that is marked with an unassigned controller and the connection that is being attempted to an assigned controller. In such cases, the make before break logic kicks in and the unassigned connection with unassigned controller is torn down once the assigned connection with assigned controller is brought up, i.e. connection with the controller of the second controller group with which there is the existing connection, is terminated after establishing the connection with the controller of the first controller group. An unassigned controller includes any controller that is not in assigned controller group list. The second controller group corresponds to the controller group that is not in assigned controller group list. The assigned controller group list includes controller group corresponding to the controllers that the router has hashed to in each of the controller groups specified in the controller group list. The list of assigned and unassigned controllers can be maintained at the router, or at the controller or at both.

The configurations of the router or the controller can vary based on optimization required for the SDN. The configurations based on the optimization can be specified by the SDN administrator. Based on the configurations, various advantages of the present disclosure can be achieved. The configurations and corresponding optimizations are now explained with help of exemplary use cases.

Use case 1—Data Center Redundancy

This is achieved by making connections from each router to at least one controller in each datacenter in order to account for complete datacenter failure.

Use Case 2—Fall Back

This is achieved by making connections from each router in a geographical region (e.g., the USA_ to preferred local pool of controllers (for example USA-East, USA-West) and fall back on to remote pool of controllers (for example India-East, India-West) when local pool fails.

Use Case 3—Managing Scale

This is achieved by limiting connections from each router such that the scale number of OMP session is limited to a Max-OMP-Session, i.e. <X>, (+1 during transience) which could be very helpful while designing large scale SDNs.

Use Case 4—Creating Mini Fault Isolation Domains to Provide High Availability.

This is achieved by allowing redundant routers in the same site to connect to different controller groups. This allows for zero-downtime during maintenance windows for upgrades or outages at the controller level.

Use Case 5—Distributing and Lowering Load on Controllers

As the controllers are identified by controller group ID's, the SDN load can be intelligently distributed without having to over-provision the hardware and software capabilities of the controller. This provides greater stability and cost savings.

Use Case 6—Effective Bandwidth Usage

This is achieved by defining the preference and the number of connections that the SDN administrator wishes to establish through a particular transport interface of the controller, as the bandwidth utilization can be managed and restricted to more cost-effective or efficient tunnels as per the requirements of the SDN bandwidth utilization which would include both distributed control plane messaging as well as network management updates to the NMS 202.

It should be noted that there are other best practices or use cases as well. For example, all controller groups can be present in the controller group list configured on the router. Priority and number of connections can be manipulated based on exclude-controller-group-list. This provides additional redundancy in case of loss of connectivity to preferred groups. In some scenarios, Exclude-controller-group-list can be a subset of the controller group ID list. The number of controllers per controller-group-id can be equally distributed. Hardware capabilities, i.e. memory and CPU, of the controllers can be identical.

In various embodiments, the configuration can happen in following manner.

```
Controller
  config>
    system>
      controller-group-id [default] <Controller group 204A
Router
  config>
    system>
      controller-group-list [default] <Controller group 204A Controller group 204N>
      max-omp-sessions [2] <100
      vpn0>
        interface>
          tunnel-interface>
            max-control-connections[2] <3>
            exclude-controller-group-list
              <Controller group 204A Controller
```

-continued

```
              group 204N>
        interface>
          tunnel-interface>
            max-control-connections [2] <1>
```

In various embodiments, the router sends its transport location address (TLOC), and other information to the connected controller via the connection that exists between the two. In accordance with one embodiment, the controller may store the TLOC for the router.

Figure 3:
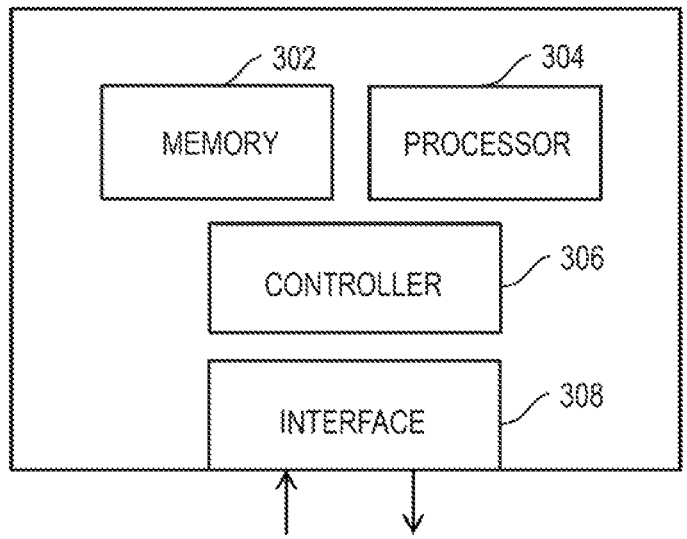
FIG. 3 illustrates a controller, in accordance with an example embodiment of the present disclosure.

An exemplary construction of a controller 206 is now described by reference to FIG. 3, which shows exemplary controller hardware/system according to an aspect of the present disclosure. The controller 206 includes a memory 302, a processor 304, a controller 306, and an interface 308. The memory 302, may be a volatile memory, or may alternatively be a non-volatile memory, or persistent memory, that can be electrically erased and reprogrammed and that may be implemented, for example, as a flash memory or as a data storage module. The memory 302 could further represent a plurality of memory modules including volatile and/or non-volatile modules. The processor 304 as well as the controller 306 may be any commercially available, general-purpose processor, or may be specifically designed for operation in the controller 206. One or both of the processor 304 and the controller 306 may also include arrays of processors and/or controllers. These two elements 304 and 306 are shown as distinct components of FIG. 3 in order to better highlight their respective features. However, those skilled in the art will readily recognize that the processor 304 and the controller 306 may be combined in a generic processing element or an appropriately designed or programmed processing element, capable of performing features of both the processor 304 and the controller 306. The processor 304 and the controller 306 may both be operable to execute processes related to the present disclosure as described above in addition to numerous other processes. The interface 308 communicates with other routers. It may be implemented as one single device or as distinct devices for receiving and sending signaling, messages and data. The controller 206 may include, in various embodiments, various types of devices such as, for example, a satellite TV transmitter, a cable TV transmitter, a specially programmed internet protocol server, routers, servers, and the like. The controller 206 may communicate with routers either directly or through physical intermediate nodes. Therefore, the interface 308 may include a plurality of devices for connecting on links of different types. Only one generic interface 308 is illustrated for ease of presentation of the present disclosure.

Figure 4:
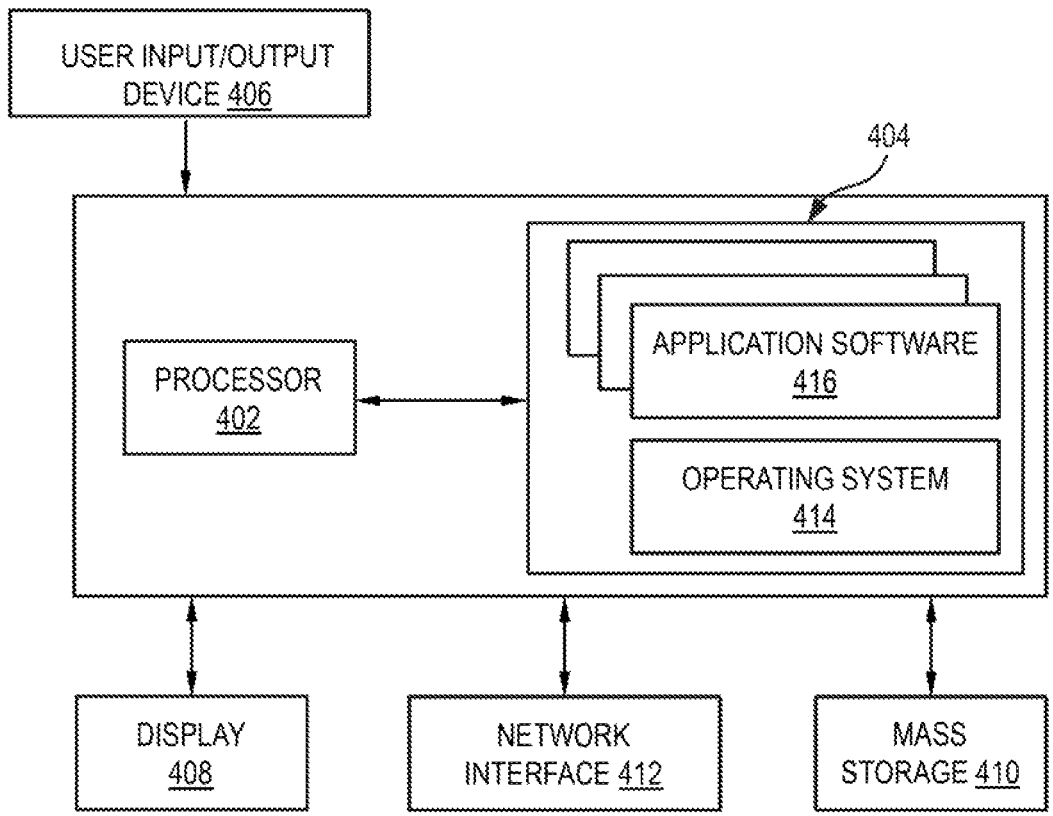
FIG. 4 illustrates a controller, m accordance with another example embodiment of the present disclosure.

FIG. 4 shows an example of the controller 206, in accordance with another embodiment. The controller 206 may include at least one processor 402 coupled to a memory 404. The processor 402 may represent one or more processors (e.g., microprocessors), and the memory 404 may represent random access memory (RAM) devices including a main storage of the hardware, as well as any supplemental levels of memory e.g., cache memories, non-volatile or back-up memories (e.g. programmable or flash memories), read-only memories, etc. In addition, the memory 404 may be considered to include memory storage physically located elsewhere in the hardware, e.g. any cache memory in the processor 402, as well as any storage capacity used as a virtual memory, e.g., as stored on a mass storage device.

The controller 206 also typically receives a number of inputs and outputs for communicating information externally. For interface with a user or operator, the controller 206 may include one or more user input-output (I/O) devices 406 (e.g., a keyboard, mouse, etc.) and a display 408. For additional storage, the controller 206 may also include one or more mass storage devices 410, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the controller 206 may include an interface with one or more networks interface 412 to connect to networks such as a local area network (LAN), a wide area network (WAN), a wireless network, and/or the Internet among others to permit the communication of information with other computers coupled to the networks. It should be appreciated that the controller 206 typically includes suitable analog and/or digital interfaces between the processor 402 and each of the components, as is well known in the art.

The controller 206 operates under the control of an operating system 414, and executes application software 416 which includes various computer software applications, components, programs, objects, modules, etc. to perform the techniques described above.

In general, the routines executed to implement the embodiments of the present disclosure, may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects of the invention. Moreover, while the present disclosure has been described in the context of fully functioning computers and computer systems, those skilled in the art will appreciate that the various embodiments of the invention are capable of being distributed as a program product in a variety of forms, and that the present disclosure applies equally regardless of the particular type of machine or computer readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 5:
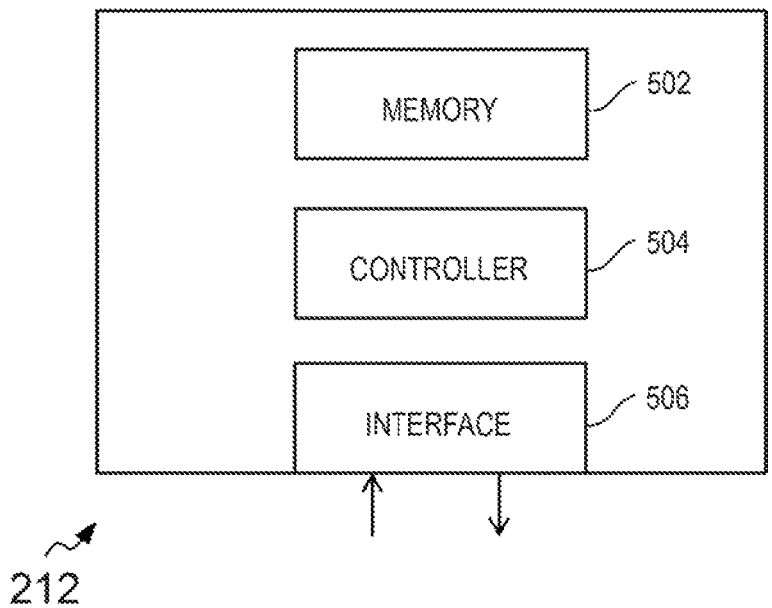
FIG. 5 illustrates a router, in accordance with an example embodiment of the present disclosure.

An exemplary construction of a router 212 is now described by reference to FIG. 5, according to an embodiment of the present disclosure. The router 212 includes a memory 502, a controller 504 and an interface 506. The memory 502, may be a volatile memory, or may alternatively be a non-volatile memory, or persistent memory, that can be electrically erased and reprogrammed and that may be implemented, for example, as a flash memory or as a data storage module. The memory 502 could further represent a plurality of memory modules including volatile and/or non-volatile modules. The controller 504 may be any commercially available, general purpose processor, or may be specifically designed for operation in the router 212. The controller 504 may be operable to execute processes related to the present disclosure described above in addition to numerous other processes. The controller 504 may also include an array of processors and/or controllers. The interface 506 communicates with controllers. It may be implemented as one single device or as distinct devices for receiving and sending signaling, messages and data. The router 212 may include, in various embodiments, various types of devices such as, for example, a satellite TV decoder, a cable TV decoder, a personal computer, a gaming device, a router, and the like. Therefore, the interface 506 may include a plurality of devices for connecting on links of different types. Only one generic interface 506 is illustrated for ease of presentation of the present disclosure.

Figure 6:
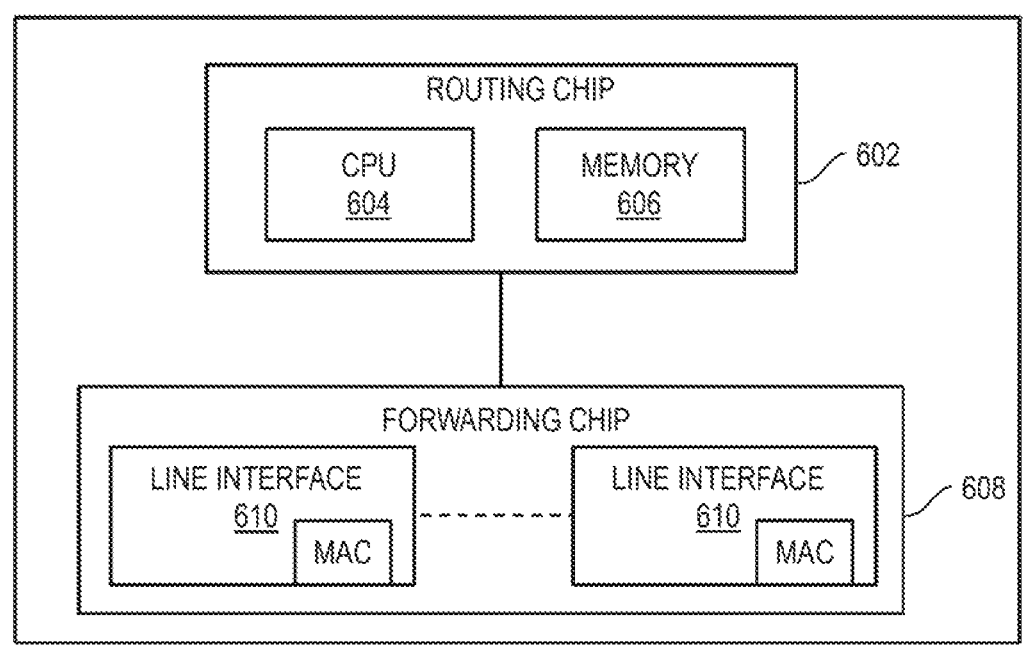
FIG. 6 illustrates a router, m accordance with another example embodiment of the present disclosure.

FIG. 6 shows a block diagram of the router 212, in accordance with another embodiment of the present disclosure. Referring to FIG. 6, the router 212 includes a routing chip 602 coupled to a forwarding chip 608. The routing chip 604 performs functions such as path computations, routing table maintenance, and reachability propagation, token management, token marking, and other functions as described herein. Components of the routing chip 602 include a CPU or processor 604, which is coupled to a memory 606. The memory 606 stores instructions to perform the methods disclosed herein. The forwarding chip 608 is responsible for packet forwarding along a plurality of line interfaces 610.

Figure 7:
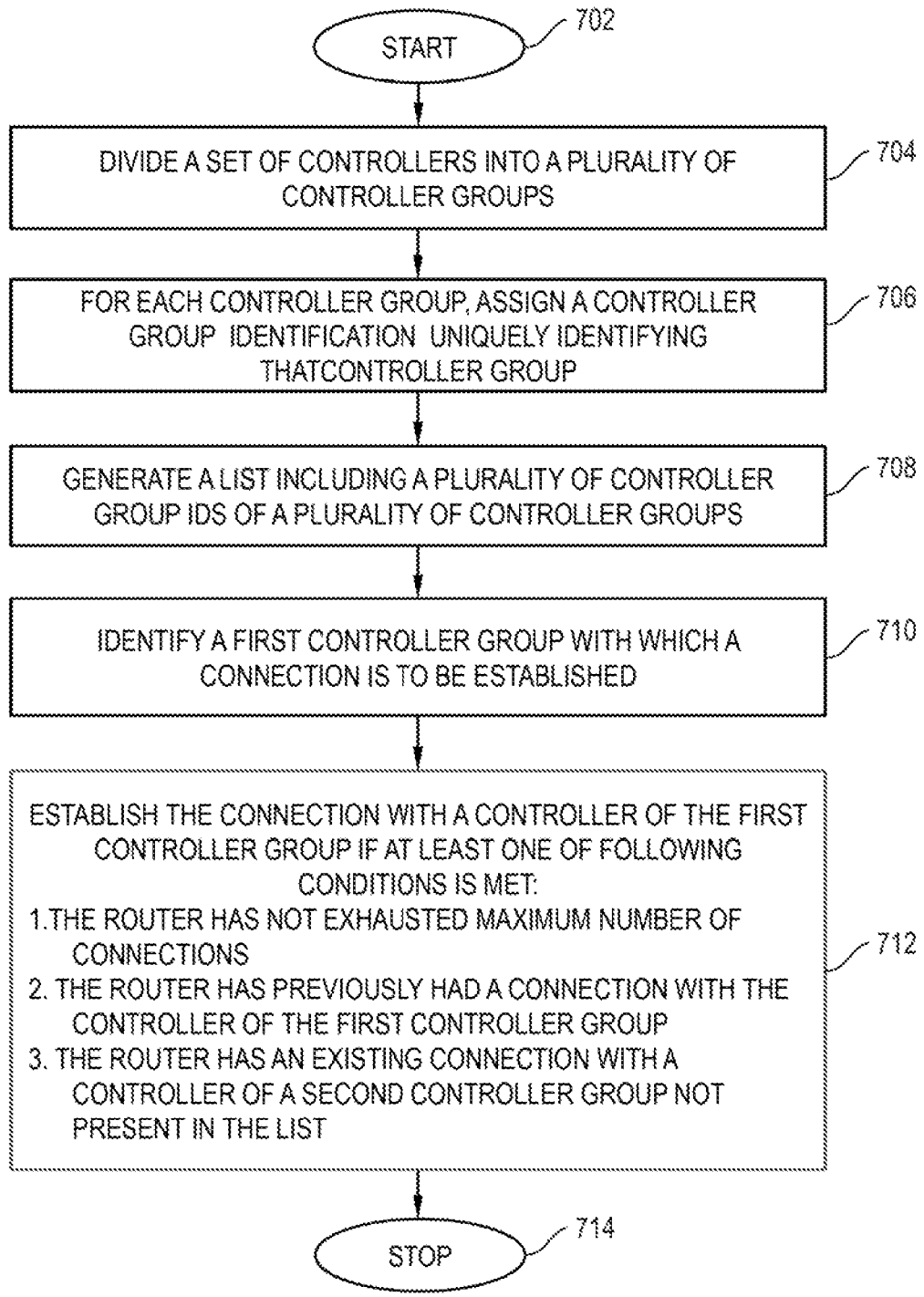
FIG. 7 illustrates a method for managing connection with a distributed control plane, in accordance with an example embodiment of the present disclosure.

FIG. 7 illustrates a method for managing connection with a distributed control plane, in accordance with an example embodiment of the present disclosure.

The method starts at step 702.

At step 704, a set of controllers are divided into a plurality of controller

At step 706, for each controller group of the plurality of controller groups, a controller group ID is assigned. The controller group ID uniquely identifies the controller group.

At step 708, a controller group ID list or the controller group list is generated. The list includes the plurality of controller group IDs of the plurality of controller groups in order of connection priority.

At step 710, a first controller group based on the order of connection priority is identified from the list. A connection is to be established between a controller of the first controller group and corresponding router.

At step 712, the connection is established if at least one of following conditions is met. The conditions are checked before establishing the connection. The conditions include Condition 1) The router has not exhausted maximum number of connections, Condition 2) the router has previously had a connection with the controller of a first controller group, and Condition 3) the router has an existing connection with a controller of a second controller group not present in the controller group ID list.

The exemplary implementation of the method is now explained using example of tokens. It is to be appreciated that any mechanism other than tokens can also be used.

Initially, each controller is configured to belong to a particular controller-group-id (CGID). Each router is configured to have a list of CGIDs in order of connection priorities. The list can be referred to as the controller group ID list or the controller group list because each controller group ID uniquely identifies corresponding controller group. In one embodiment, the configuration is performed at the system level, i.e. at the overlay management protocol (OMP) session level in decreasing order of preference of controller groups with which connections are to be established in a round-robin fashion moving through the controller group ID list.

Each router is configured to have <X> number of unmarked Tokens at the start, where X is the number of unique controllers that the SON administrator wants the router to establish a connection with and is configured at the system level, i.e. at the OMP session level, for the router.

Each transport interface on the router is also provided with <Y> number of tokens, where Y is the number of connections the SDN administrator wishes to establish through a particular transport and is configured at the interface level. In other words, a first set of one or more tokens, i.e. <X> tokens, are allocated to the router, wherein the first set of one or more tokens indicate maximum number of OMP sessions that the router can have. A second set of one or more tokens, i.e. <Y> tokens, are allocated to the transport interface of the router, wherein the second set of one or more tokens indicate maximum number of connections that the router can have through a particular transport corresponding to the transport interface.

Each transport interface on the connection 210 or corresponding router can also be configured with an Exclude-Controller-Group-List (EXCGL) in order to skip token allocation to a particular controller group while moving in a round-robin fashion through the controller group ID list, i.e. the transport interface is assigned or allocated with an exclusion list of controller group IDs of one or more controller groups with which connection is to be never established.

Each transport interface on the connection 210 or corresponding router tries to establish a minimum of (X, Y) count of connections towards assigned controllers. The maximum number of connections that the router can have with the plurality of controller groups in the controller group ID list is calculated as a minimum number of 1) a number of one or more tokens in the first set, and 2) a number of one or more tokens in the second set.

The assigned controllers include controllers that the router has hashed to in each of the controller groups specified in the controller group list. In an illustrated example (see FIG. 2), the maximum number of OMP sessions, i.e. X is limited to 2, and the maximum number of connections, i.e. Y, that the router can have with the controller groups for a particular transport are also limited to 2. Hence, each router is connected to two controllers of two controller groups in FIG. 2. It is to be appreciated that in various embodiments, the number of connections per router can vary and can take any number.

Once a connection is established, then an unmarked token is marked with the <CGID+Controller-IP>, i.e. upon establishment of the connection between the router and a controller of a first controller group, a token in the first set and a token in the second set are marked with controller group ID of the first controller group and with IP address of the controller of the first controller group. The controller-IP is the IP address of the controller. The first controller group refers to the controller group identified from the controller group ID list with which the connection of the router is to be established in order of connection priority.

The condition that the router has not exhausted maximum number of connections is identified by determining at least one unmarked token. This is the case when there is at least one unmarked token available.

The condition that the router has previously had a connection with the controller of the first controller group is identified by determining a token marked with controller group ID of the first controller group and with internet protocol (IP) address of the controller of the first controller group. This is the case when there is a marked token with same <CGID+Controller-IP> to which the transport corresponding to the router is trying to connect.

The condition that the router has an existing connection with the controller of the second controller group not present in the controller group ID list, is identified by determining a token marked with controller group ID of the second controller group and with internet protocol (IP) address of a controller of the second controller group. This is the case when there is a token that is marked with an unassigned controller and the connection that is being attempted is to an assigned controller. In such cases, the make before break logic kicks in and the unassigned connection with unassigned controller is torn down once the assigned connection with assigned controller is brought up, i.e. connection with the controller of the second controller group with which there is the existing connection is terminated after establishing the connection with the controller of the first controller group.

The method stops at step 714.

Figure 8:
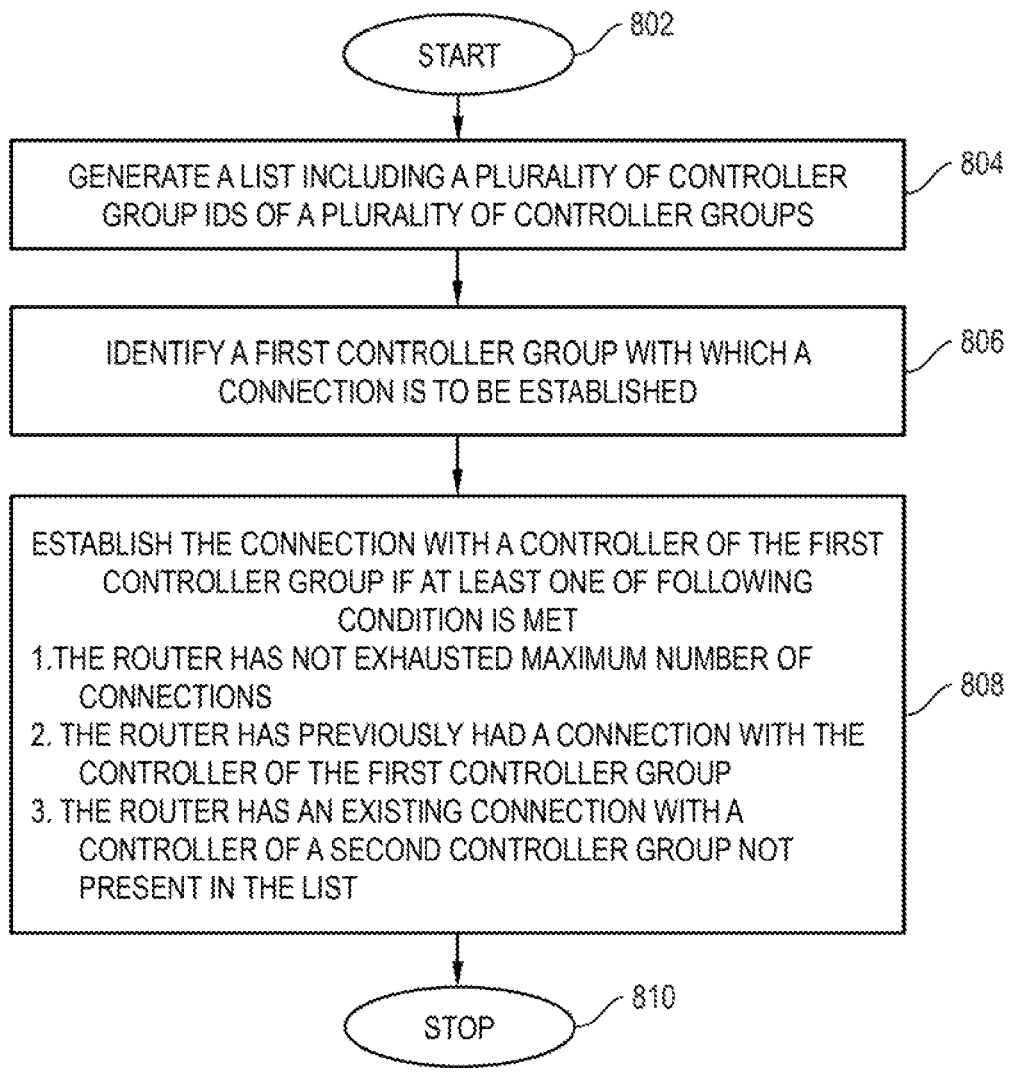
FIG. 8 illustrates a method for managing connection with a distributed control plane, in accordance with another example embodiment of the present disclosure.

FIG. 8 illustrates a method, performed by a router (e.g., the router 212), for managing connection with a distributed control plane, in accordance with another example embodiment of the present disclosure.

The method starts at step 802 and is performed by the router.

At step 804, a controller group ID list or the controller group list is generated. The list includes the plurality of controller group IDs of the plurality of controller groups in order of connection priority.

At step 806, a first controller group based on the order of connection priority is identified from the list. A connection is to be established between a controller of the first controller group and corresponding router.

At step 808, the connection is established if at least one of following conditions is met. The conditions are checked before establishing the connection. The conditions include Condition 1) The router has not exhausted maximum number of connections, Condition 2) the router has previously had a connection with the controller of a first controller group, and Condition 3) the router has an existing connection with a controller of a second controller group not present in the controller group ID list.

The method stops at step 810.

It is to be appreciated that details of the steps of FIG. 8 remains similar to that described in FIG. 7.

Figure 9:
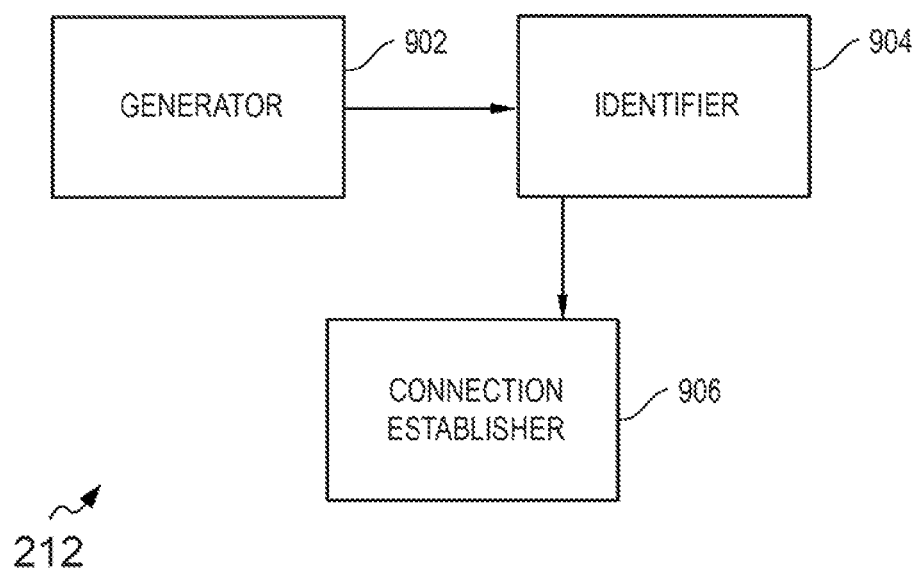
FIG. 9 illustrates a block diagram of a router indicating various blocks managing connection with a distributed control plane, in accordance with an example embodiment of the present disclosure.

FIG. 9 illustrates a block diagram of a router indicating various blocks managing connection with a distributed control plane, in accordance with an example embodiment of the present disclosure.

The router 212 includes a generator 902 for generating a controller group ID list or the controller group list. The list includes the plurality of controller group IDs of the plurality of controller groups in order of connection priority. The list is generated as explained in earlier figures.

The router 212 also includes an identifier 904 for identifying a first controller group based on the order of connection priority from the list. A connection is to be established between a controller of the first controller group and corresponding router.

Further, the router 212 includes a connection establisher 906 for establishing the connection if at least one of following conditions is met. The conditions are checked before establishing the connection. The conditions include Condition 1) The router has not exhausted maximum number of connections, Condition 2) the router has previously had a connection with the controller of a first controller group, and Condition 3) the router has an existing connection with a controller of a second controller group not present in the controller group TD list.

It is to be appreciated that details of the functioning of the router 212 remains similar to that described in FIG. 8. The generator 902, the identifier 904 and the connection establisher 906 are logical modules that can be implemented using one or more processors or controllers as described in FIG. 3 and FIG. 4.

It is to be appreciated that some steps of the router can be performed by the controller or by a combination of both. For example, the step of generating the controller group ID list, the establishing of the connection etc.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method for managing connections with a distributed control plan, the method comprising:
    generating, by a router, a controller group identifier (ID) list comprising a plurality of controller group IDs of a plurality of controller groups, wherein one controller group ID uniquely identifies one controller group;
    identifying a first controller group, by the router from the list, with which a connection is to be established;
    maintaining a list of conditions, the conditions including:
        the router has not exhausted maximum number of connections;
        the router has previously had a connection with the controller of a first controller group; and
        the router has an existing connection with a controller of another controller group not present in the controller group ID list;
    establishing, by the router, the connection with a controller of the first controller group in response to satisfaction of at least one of the conditions, wherein the establishing is based on a number of tokens in a first set of one or more tokens allocated to the router, wherein the first set of tokens indicate a number of overlay management protocol (OMP) sessions that the router is allowed;
    allocating the first set of one or more tokens to the router;
    allocating a second set of one or more tokens to a transport interface of the router, wherein the second set of one or more tokens indicate a maximum number of connections that the router can have through a particular transport corresponding to the transport interface.

2. The method as claimed in claim 1, wherein the plurality of controller group IDs are listed in decreasing order of connection priority.

3. The method as claimed in claim 1 and further comprising:
    assigning the transport interface with an exclusion list of controller group of IDs of one or more controller groups with which connection is not to be established.

4. The method as claimed in claim 1, wherein the maximum number of connections that the router can have with the plurality of controller groups in the controller group ID list is calculated as a minimum number from:
    the number of one or more tokens in the first set; and
    a number of one or more tokens in the second set.

5. The method as claimed in claim 4 and further comprising:
    upon establishment of the connection between the router and the controller of the first controller group, marking a token in the first set and a token in the second set with controller group ID of the first controller group and with internet protocol (IP) address of the controller of the first controller group.

6. A non-transitory computer-readable media having stored instructions which when executed by a router causes the router to perform operations comprising:
    generating, by a router, a controller group identifier (ID) list comprising a plurality of controller group IDs of a plurality of controller groups, wherein one controller group ID uniquely identifies one controller group;
    identifying a first controller group, by the router from the list, with which a connection is to be established;
    maintaining a list of conditions, the conditions including:
        the router has not exhausted maximum number of connections;
        the router has previously had a connection with the controller of a first controller group; and
        the router has an existing connection with a controller of another controller group not present in the controller group ID list;
    establishing, by the router, the connection with a controller of the first controller group in response to satisfaction of at least one of the conditions, wherein the establishing is based on a number of tokens in a first set of one or more tokens allocated to the router, wherein the first set of tokens indicate a number of overlay management protocol (OMP) sessions that the router is allowed;
    allocating the first set of one or more tokens to the router;
    allocating a second set of one or more tokens to a transport interface of the router, wherein the second set of one or more tokens indicate a maximum number of connections that the router can have through a particular transport corresponding to the transport interface.

7. The media as claimed in claim 6, wherein the plurality of controller group IDs are listed in decreasing order of connection priority.

8. The media as claimed in claim 6, the operations further comprising:
    assigning the transport interface with an exclusion list of controller group of IDs of one or more controller groups with which connection is not to be established.

9. The media as claimed in claim 6, wherein the maximum number of connections that the router can have with the plurality of controller groups in the controller group ID list is calculated as a minimum number from:
    the number of one or more tokens in the first set; and
    a number of one or more tokens in the second set.

10. The media as claimed in claim 9, the operations further comprising:
    upon establishment of the connection between the router and the controller of the first controller group, marking a token in the first set and a token in the second set with controller group ID of the first controller group and with internet protocol (IP) address of the controller of the first controller group.

11. A router comprising:
a processor; and
a memory coupled to the processor, the memory storing instructions which when executed cause the router to perform operations comprising:
  generating, by a router, a controller group identifier (ID) list comprising a plurality of controller group IDs of a plurality of controller groups, wherein one controller group ID uniquely identifies one controller group;
  identifying a first controller group, by the router from the list, with which a connection is to be established;
  maintaining a list of conditions, the conditions including:
    the router has not exhausted maximum number of connections;
    the router has previously had a connection with the controller of a first controller group; and
    the router has an existing connection with a controller of another controller group not present in the controller group ID list;
  establishing, by the router, the connection with a controller of the first controller group in response to satisfaction of at least one of the conditions, wherein the establishing is based on a number of tokens in a first set of one or more tokens allocated to the router, wherein the first set of tokens indicate a number of overlay management protocol (OMP) sessions that the router is allowed;
  allocating the first set of one or more tokens to the router;
  allocating a second set of one or more tokens to a transport interface of the router, wherein the second set of one or more tokens indicate a maximum number of connections that the router can have through a particular transport corresponding to the transport interface.

12. The router as claimed in claim 11, wherein the plurality of controller group IDs are listed in decreasing order of connection priority.

13. The router as claimed in claim 11, the operations further comprising:
  assigning the transport interface with an exclusion list of controller group of IDs of one or more controller groups with which connection is not to be established.

14. The router as claimed in claim 11, wherein the maximum number of connections that the router can have with the plurality of controller groups in the controller group ID list is calculated as a minimum number from:
  the number of one or more tokens in the first set; and
  a number of one or more tokens in the second set.

* * * * *